US005704736A

United States Patent [19]
Giannetti

[11] Patent Number: 5,704,736
[45] Date of Patent: Jan. 6, 1998

[54] DOVE-TAIL END MILL HAVING REPLACEABLE CUTTER INSERTS

[76] Inventor: Enrico R. Giannetti, P.O. Box 770785, Houston, Tex. 77215

[21] Appl. No.: 488,693

[22] Filed: Jun. 8, 1995

[51] Int. Cl.⁶ .................................................. B23C 5/20
[52] U.S. Cl. ........................... 407/35; 407/43; 407/48; 407/103
[58] Field of Search ...................... 407/43, 47, 48, 407/40, 41, 56, 67, 103, 104, 105, 113, 35, 34, 54, 53

[56] References Cited

U.S. PATENT DOCUMENTS

| 3,393,435 | 7/1968 | Viellet | 407/105 |
|---|---|---|---|
| 3,488,822 | 1/1970 | Jones | 407/105 |
| 3,708,843 | 1/1973 | Erkfritz | 407/104 X |
| 4,105,357 | 8/1978 | Kehl | 407/41 |
| 4,334,446 | 6/1982 | Field | 407/40 X |
| 4,397,592 | 8/1983 | Erickson | 407/104 X |
| 4,645,383 | 2/1987 | Lindsay | 407/40 X |

FOREIGN PATENT DOCUMENTS

DT197808  8/1978  Germany ...................... 407/104

Primary Examiner—Daniel W. Howell
Assistant Examiner—Henry W. H. Tsai
Attorney, Agent, or Firm—James L. Jackson; Gary L. Bush; Eugene N. Riddle

[57] ABSTRACT

A dove-tail end mill having a cutter shank with a milling head supporting a plurality of replaceable standard 60° triangular cutter inserts. The cutter inserts are designed and oriented with respect to the cutter head to position cutter edges for generating the inclined undercut surface of a dove-tail slot. Simultaneously, the cutter configuration is designed to establish a clearance angle between the lower cutting edge of each of the cutters and the planar surface being generated by the cutter inserts. The milling head defines a plurality of cutter stations each having planar support surfaces for stabilization of the respective cutter inserts and cutter orientation shoulders for accurate positioning of each of the cutter inserts with respect to the cutting head. The cutting head supports each of the cutter inserts to define a cutting rake of about plus 15° and axial rake of about plus 10° and a radial rake of about minus 14°.

9 Claims, 3 Drawing Sheets

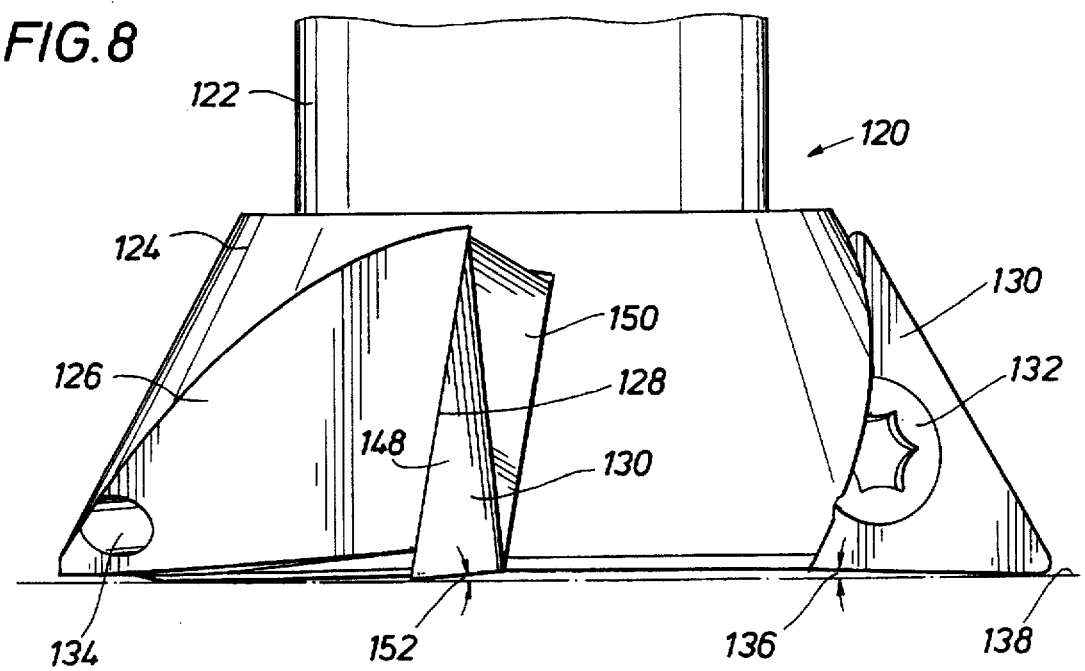
FIG. 8
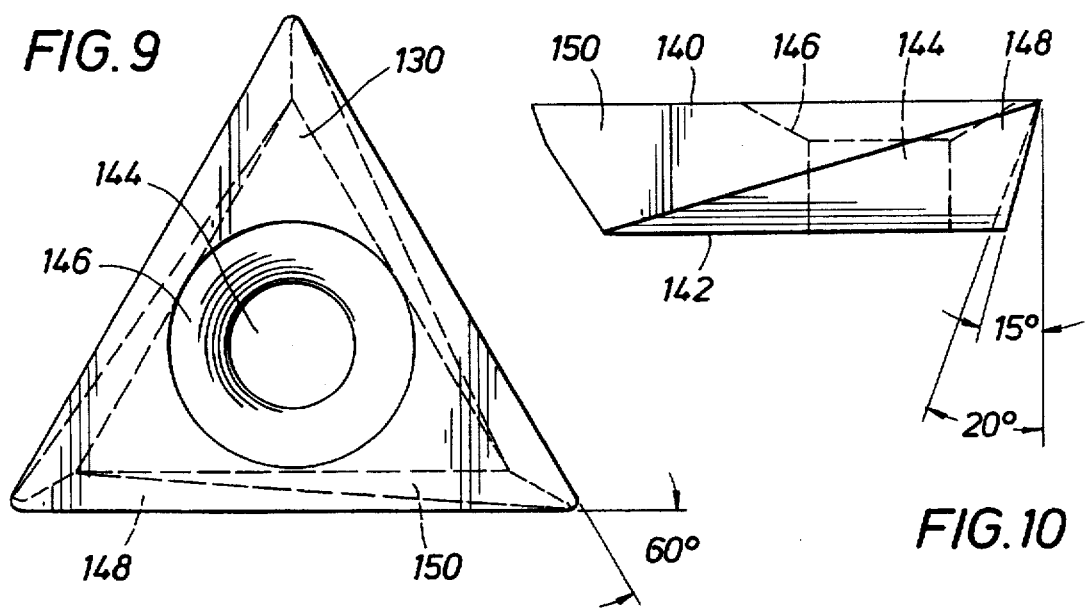
FIG. 9
FIG. 10
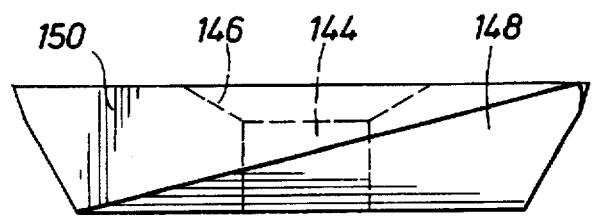
FIG. 11

DOVE-TAIL END MILL HAVING REPLACEABLE CUTTER INSERTS

FIELD OF THE INVENTION

This invention relates generally to end mills for machining operations and more particularly to dove-tail end mills having the capability of machining undercut or dove-tail slots such as are commonly employed for mechanical interconnection of components, particularly moveable components. More specifically, the present invention concerns a dove-tail end mill tool for rotary cutting operations which is provided with a plurality of replaceable cutter inserts which are configured and arranged for optimum dove-tail end milling operations in which effectively position the cutter inserts of the end mill of optimum cutting rake, axial rake and radial rake.

BACKGROUND OF THE INVENTION

Dove-tail slots are widely used in mechanical components where a mechanically interlocked relationship is intended between mechanical members and especially when moveable or adjustable positioning of mechanical components is desired. In the past, the machining operations for dove-tail slots has been accomplished through the use of machining arbors having appropriately angulated surfaces for cutting the angled portions of the dove-tail slot. Typically arbors for dove-tail end milling operations must be used in connection with other machining operations and thereby require significant setup time in the milling of dove-tail slots. More recently, dove-tail cutters have been developed which are specifically designed to take the place of arbor type dove-tail cutters. The advantage of dove-tail cutters is that the typically reduce the setup time and also facilitate ease in handling so as to provide an exceptionally benefit tool for milling dove-tail slots. Typically dove-tail cutters define a plurality of angulated cutter blades which are each designed with appropriate angles of cutting rake, axial rake, and radial rake. Typically the cutter blades of dove-tail cutters are permanently fixed to the tool and composed of various durable cutter materials such as carbide, and cobalt. Even though these end mill cutter devices are composed of exceptionally durable hard materials, nevertheless in time the cutter edges will become worn to the point that efficient end milling operations cannot be accomplished. In such case the dove-tail cutter must be sharpened to restore its cutting capability. In many cases sharpening of dove-tail cutters will change the cutter dimension to the point that it will no longer be acceptable for cutting dove-tail slots of a particular dimension. For this reason, in many cases dove-tail cutters are simply discarded when they become worn. Obviously, discarding an expensive dove-tail end mill cutter of this nature renders machining operations expensive. It is desirable therefore to provide a dove-tail end mill cutter device that need not be discarded or specifically sharpened in the event the cutting edges thereof become worn.

Replaceable cutter inserts have been widely used in various machining operations, particularly lathe operations and the like where the work is rotated about an axis and is engaged by a cutter tool that is moveable in controlled manner to achieve various machining operations such as turning, thread cutting, etc. Replaceable machining cutter inserts of triangular configuration, having three cutting points are frequently utilized for various metal turning operations, threading operations, etc. Typically these cutter points have an included angle of 60° and the cutter elements are designed with the clearance angles at the cutting edge and with appropriate cutting rake and axial rake. When one of these cutting angles becomes dulled the cutter insert is simply removed and rotated to position another of its cutting points for cutting, threading or like and is then secured in immovable relation with the cutter support. The cutter is discarded and replaced when each of its three cutter points become worn.

Typical 60° cutter inserts have not heretofore been employed for dove-tail end mills because the cutter inserts, when positioned for proper cutting, have no clearance so that the entire cutting edge of the cutter would be located in the cutter plane. This of course would cause the cutter to become worn quite quickly. It is desirable however to provide a dovetail end mill having replaceable cutters and which also provides the cutters with clearance between the outer or inner points thereof to minimize cutter wear and to yet provide selective cutting of 15° degree and 60° dove-tail slots.

SUMMARY OF THE INVENTION

It is a principal feature of the present invention therefore to provide a novel dove-tail end mill having a plurality of replaceable, generally triangular cutter inserts that are positioned so as to establish clearance between the inner and outer points thereof with respect to the plane of rotation of the outer cutter point to thereby provide a dove-tail end mill of exceptional durable character.

It is another feature of the present invention to provide a novel dove-tail end mill cutter having replaceable cutter inserts and being provided for use as a side cutting indexable dove-tail end mill which may be provided for cutter shanks of various dimension.

It is another feature of the present invention to provide a novel dove-tail end mill cutter device having replaceable cutter inserts and which may be provided in either 15° or 60° dove-tail style and which employs a 15° positive rake triangle insert set at positive cutting rake angles to thus provide for maximum cutting performance.

It is an even further feature of the present invention to provide a novel dove-tail end mill tool having replaceable cutter inserts wherein the inserts are indexable and will not require sharpening when dull and are easy to index when using a torx screw locking system.

It is also a feature of the present invention to provide a novel dove-tail end mill cutting tool that is efficiently designed for rigidity and chatter free use and which will aid in increased productivity and quality as compared with high speed steel tooling.

It is an even further feature of the present invention to provide a novel dove-tail end mill cutter device having replaceable triangular cutter inserts and which may be effectively employed on cnc machining centers, conventional milling machines and vertical milling machines.

It is also a feature of the present invention to provide a novel dove-tail end mill cutter having replaceable cutter inserts and which defines tool angles in the range of plus 15° cutting rake, plus 10° axial rake and minus 14° radial rake.

It is an even further feature of the present invention to provide a novel dove-tail end mill cutter device having replaceable cutter inserts and employing a cutter head having cutter positioning surfaces and shoulders that effectively orient the triangular cutters for optimum cutting rake, axial rake and radial rake and which also position the cutters for clearance angle relative to the cutter plane that is defined by the points of the cutter inserts.

Briefly, the various objects and features of the present invention are realized through the provision of a dove-tail cutter tool shown generally at 10 having a rotary cutter shank 12 which may conveniently take any suitable form but which is shown as having the form of a Weldon shank.

At the lower end of the generally cylindrical shank 12 there is provided a generally conical milling head 14 having to define thereon a plurality of cutter seats each having a planar support surface to provide rigid support for the cutter element and a cutter orientation shoulder which is tightly engaged by a surface of the cutter for orienting the cutter in precise cutting relation with respect to the milling head. Each of the cutter seats is oriented at a designed angle with respect to the axis of cutter rotation and it is further oriented to provide a particularly designed axial rake as well as cutting rake and radial rake. The cutting rake and axial rake are positive angles while the radial rake is a negative angle to provide for maximum cutting performance. Further, the cutter elements are standard 60° cutter elements which are specifically oriented relative to the positioning and supporting surfaces of the cutter seats so as to provide a clearance angle with respect to the cutting plane of the tool to thus provide for efficient service life of the cutter elements during operation of the tool.

The triangular cutter elements of the tool may also be designed with relieved cutter areas to thereby further enhance the milling capability and serviceability of the dove-tail end mill tool.

BRIEF DESCRIPTION OF THE DRAWINGS

The present invention has the above as well as other objects, features and advantages which will become more clearly apparent in connection with the following detailed description of a preferred embodiment, taken in conjunction with the appended drawings.

In the drawings:

FIG. 8 is a partial elevational view of an end mill for cutting dove-tail slots and representing an alternative embodiment of the present invention and having replaceable triangular cutter insert elements of non-standard configuration.

FIG. 9 is a plan view of a triangular replaceable cutter insert element of the end mill of FIG. 8.

FIG. 10 is a side elevational view of the cutter element of FIGS. 8 and 9 and showing the clearance angles of the cutter insert.

FIG. 11 is a side elevational of the cutter insert element of FIGS. 8–10.

DETAILED DESCRIPTION OF PREFERRED EMBODIMENT

Figure 1:
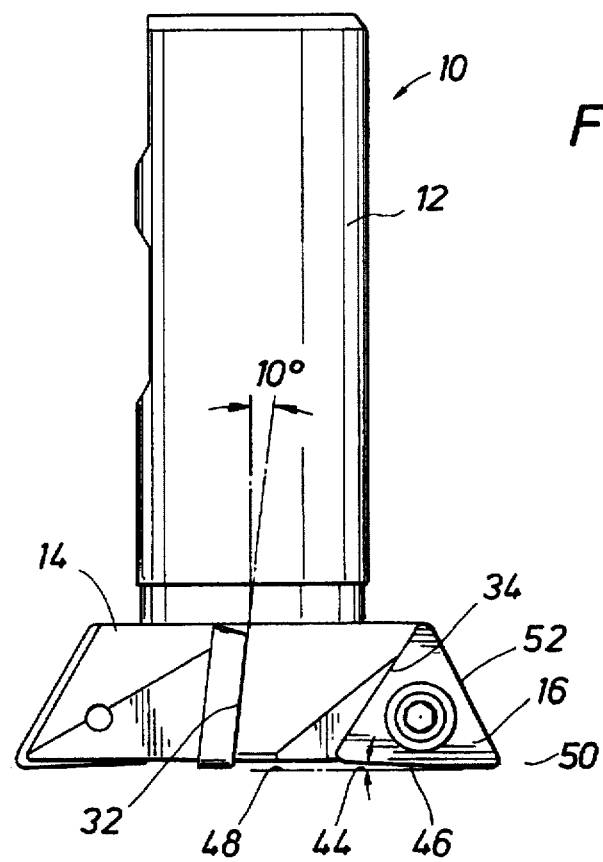
FIG. 1 is an elevational view of a dove-tail end milling tool being constructed in accordance with the teachings of this invention and being adapted for support of four replaceable cutter inserts.

Referring now to the drawings and first to FIG. 1 there is provided according to the teachings of this invention a dove-tail end mill tool shown generally at 10 having an elongate, generally cylindrical shank 12 which is shown to be of Weldon type but which might be of any other suitable type as desired. At the lower end of the shank 12 is provided a generally conical dove-tail milling head 14 having defined thereon a plurality of cutter stations or seats, each being defined for support of a replaceable, generally triangular cutter element composed of any suitable hardened metal cutting material.

Figure 2:
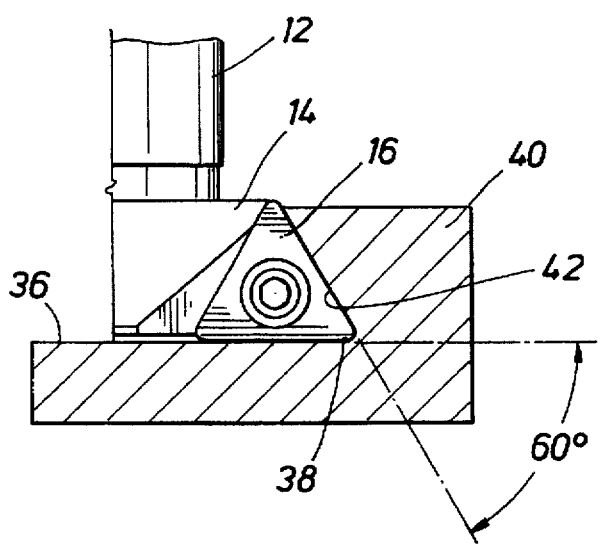
FIG. 2 is a partial elevational view of the dove-tail end milling tool of FIG. 1 and showing it during the cutting of a 60° dove-tail slot in a work piece.

The end milling tool as shown in FIG. 1 is designed for support of four generally triangular standard 60° cutter elements 16 being replaceably secured to milling head 14 by means of retainer screws 18. Although the retainer screws 18 may be of suitable type, for purposes of explanation the screws 18 are shown as torx screws which were adapted to be driven by a torx tool. The screws 18 are provided with conical screw heads 20 that are adapted to be received within conical recesses 22 that are defined centrally of the replaceable cutter elements 16 to secure the cutter elements against lateral shifting relative to the cutter head. The threaded shank 24 of the screws 18 extend through openings 26 of the cutter elements and are received within internally threaded holes 28 of respective cutter seats 30. Each of the cutter seats defines a planar support surface 32 of the general triangular configuration of the cutter element 16 and provides exceptionally support for the cutter element so that the cutter element does not chatter or vibrate or yield in any significant manner during operation of the end mill tool. For proper orientation of the cutter element relative to the cutter seat the cutter seat defines a location shoulder 34 of straight configuration which is oriented relative to the rotational axis of the shank 12 and milling head 14 so as to accurately locate the selective triangular cutting edge of the cutter relative to the cutting plane 36 of the tool. As shown in FIG. 2, the cutter plane 36 is the planar surface that is generated by the outer peripheral leading edge of the cutter which is shown at 38 in FIG. 2. The cutter 16 of FIG. 2 is oriented for cutting a 60° dove-tail slot in a work piece 40, the dove-tail slot being defined by an undercut inclined surface 42, the planar bottom surface 36 and a second undercut inclined surface being the mirror image of the inclined surface 42.

As shown in FIG. 1, the planar support surface 32 is oriented at a desired angular relation with respect to the rotational axis of the tool shank and milling head. As shown in FIG. 1 this angular relationship is shown to be 10° so that the axial rake of the cutter element 16 is plus 10°. It should be born in mind that this particular axial rake is intended as illustrative and that any other suitable axial rake may be employed without departing from the spirit and scope of the present invention.

As is evident especially at the bottom portion of FIG. 1 the location shoulder 34 and the particular standard 60° angular configuration of the replaceable cutter insert 16 is such that a clearance angle 44 is defined between the lower, straight cutting edge 46 of the cutter insert and the plane 48 which is generated by the respective projecting cutter extremities 50 of each of the cutter inserts 16. This clearance is necessary to minimize wear of the cutter inserts and to achieve efficient cutting by each of the cutter inserts of the milling tool. Even though a clearance 44 is provided as shown, the cutting edge 52 of the cutter insert is properly oriented for generation of a dove-tail slot surface 42 of desired configuration. For example, typical dove-tail slots are of 60° so that the angulated undercut surface 42 is oriented at 60° with respect to the horizontal or 30° with respect to the vertical. Another typical dove-tail slot is a 15° dove-tail slot which is generated by positioning the straight cutting edge 52 of the cutter insert at an angle of 75° with respect to the horizontal and 15° with respect to the vertical. In each case however it is desirable to provide clearance between the cutting edge 46 of the cutter insert and the horizontal plane 48 which is defined by the outer cutting points of the cutter insert and which also defines the bottom surface of the dove-tail slot.

Figure 3:
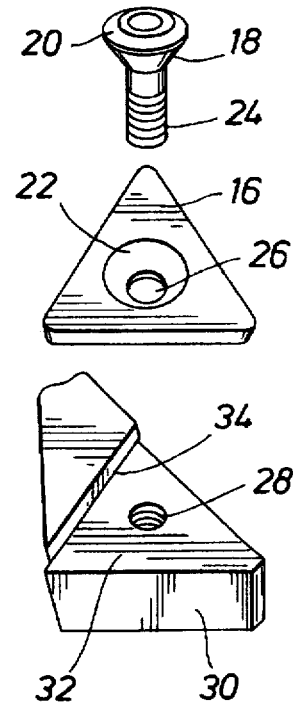
FIG. 3 is an exploded isometric illustration of one of the cutter seats, cutter inserts and insert mounting screws of the dove-tail end mill tool of FIGS. 1 and 2.
Figure 4:
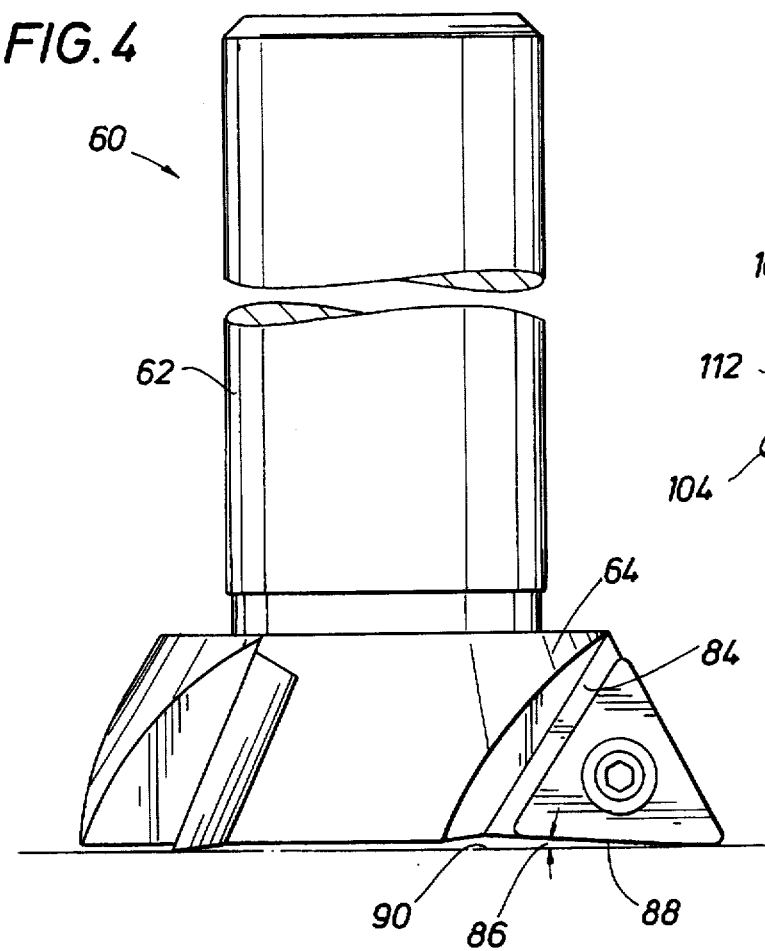
FIG. 4 is an elevational view of a dove-tail end mill constructed in accordance with the present invention and representing an alternative embodiment having three replaceable cutter elements attached to cutter supporting and positioning seats thereof.
Figure 5:
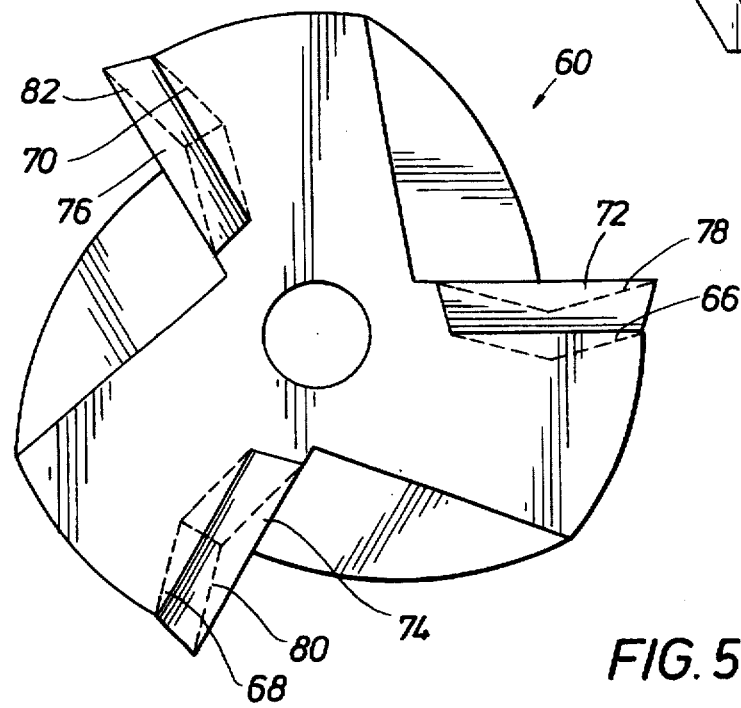
FIG. 5 is a section view taken along line 5—5 of FIG. 4.

With reference to FIGS. 4 and 5 an alternative embodiment of this invention is shown which differs from that of FIGS. 1–3 only in that the dove-tail end mill tool is designed for support of three replaceable cutter inserts. It should be born in mind that dove-tail end mill tools constructed in accordance with the present invention may have any number of cutter inserts such as 1, 2, 3, 4, etc., the number of replaceable cutter inserts being a matter of design depending upon the size of the dove-tail end mill that is employed and the dimension of the dove-tail slot to be milled. As shown in FIGS. 4 and 5 the alternative embodiment shown generally at 60 employs a generally cylindrical shank 62 having a generally conical milling head 64 at the lower extremity thereof. The milling head as best seen in FIG. 5 defines three cutter stations or seats 66, 68 and 70 each providing support for respective 60° triangular cutter inserts 72, 74 and 76 which are of the type that are typically employed for turning, threading and other rotary machining operations. When the cutters are properly positioned for the milling operation the outer cutting edges shown at 78, 80 and 82 will be positioned for cutting the properly undercut angles of the dove-tail slot. The cutter inserts are designed and positioned by the respective locator shoulders 84 of each of the cutting stations so that a clearance angle 86 exists between the lower cutting edge 88 of the cutter and the flat surface 90 being generated by rotation of the milling tool. For optimum dove-tail milling operations the various inserts of the milling tool may have a cutting rake of plus 15° and axial rake of plus 10° and a radial rake of minus 14°. Obviously these specific cutter positioning designations are not intended as limiting the scope of the present invention it being clear that any suitable angles of cutting rake, axial rake and radial rake may be employed without departing from the spirit and scope of the present invention.

Figure 6:
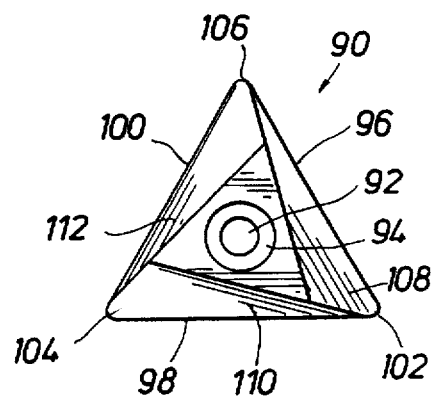
FIG. 6 is an elevational view of a generally triangular cutter element having cutter edge relief and representing an alternative of the cutter element shown in FIGS. 1–5.
Figure 7:
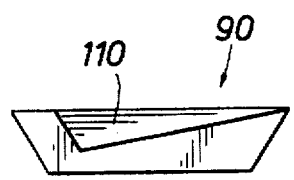
FIG. 7 is a side elevational view of the cutter element of FIG. 6.

Although the cutter elements 72, 74 and 76 may be of simple triangular configuration as shown and being the same configuration as shown at 16 in FIGS. 1–3, the cutter elements may also conveniently take the form shown in FIGS. 6 and 7. In this case, the generally triangular cutter element shown generally at 90 defines a central internally threaded hole 92 and a conical counter-sunk recess 94 which are adapted to receive a retainer screw such as the retainer screw 18 of FIG. 3 for securing the cutter element in efficiently stabilized relation with respect to a planar cutter support surface such as surface 32 of FIG. 3. The cutter insert 90 is provided with cutting edges 96, 98 and 100 of straight configuration which intersect at respective rounded cutting points 102, 104 and 106. The cutter element 90 is also formed to define relief surfaces 108, 110 and 112 with each of these cutting edges being oriented at desired included angles with respect to one another. Thus, when cutting edge 96 is properly oriented for cutting an undercut angulated surface of a dove-tail slot, the cutting edge 98 will be oriented at a slight clearance angle of about from 1° to about 3° with respect to the planar surface being cut during the milling operation.

Referring now to FIGS. 8–11 of the drawings there is show an alternative embodiment of the present invention wherein an end mill for cutting dove-tail slots is shown generally at 120 which includes a conventional tool shank 122 having a milling head 124 at the lower end thereof. The milling head is provided with a plurality of external cutter support embossments 126 each defining support shoulders 128 against which is positioned a triangular cutter tool insert 130. The various triangular cutters are retained by torx screws 132 which are threaded into internally threaded portions of drilled bores 134 that extend through the respective external embossments 126. The cutter inserts 130 are oriented to define a clearance angle as shown at 136 in FIG. 8 with respect to the planar surface 138 being generated by rotation of the end mill with respect to the work being machined.

As shown in FIG. 9 the individual cutter insert elements 130 define 60° include angles at each of the triangular corners and define opposed parallel surfaces 140 and 142 as shown in FIG. 10. As further shown in FIG. 10 the clearance angles of the cutter insert are also defined. Centrally of each cutter insert element there is provided a screw opening 144 having a conical concave surface 146 about the screws hole for receiving the tapered head of the torx retainer screw 132.

Externally, each side or cutting edge of the cutter insert element 130 defines a pair of angulated, inclined surfaces such as shown at 148 and 150 which are oriented to define a cutter relief angle 152 as shown in FIG. 8. This feature insures clean cutting and minimal wear of the cutter inserts as the end mill is rotated. The angulated orientation of the cutter elements 130 provide for effective relief at all cutting edges and the cutting point of the cutter insert to thus insure optimum cutting with minimal cutter insert wear during milling operations.

In view of the foregoing it is apparent that a dove-tail end mill tool has been disclosed herein which employs one or more replaceable cutter inserts of generally triangular configuration and which are positionable for efficient cutting of a dove-tail slot of designated dimension and angle. The cutter insert or inserts of the milling tool are positioned so that a clearance angle is defined between the lower cutting edge of the insert and the planar surface being generated by the milling tool. Thus, it is apparent that the present invention effectively accomplishes all of the features and objects hereinabove set forth together with other features which are inherent in the apparatus itself. It will be understood that certain combinations and subcombinations of this invention are of utility and may be employed without reference to other features and subcombinations. This is contemplated by and is within scope of the present invention.

It will be readily apparent to those skilled in the art that the present invention may be provided in other specific forms without departing from the spirit or essential characteristics thereof. The present embodiment is therefore to be considered only as illustrative and not restrictive, the scope of the invention being indicated by the claims rather than the foregoing description, and all changes which come within the meaning and range of the equivalence of the claims are therefor intended to be embraced therein.

What is claimed is:

1. A dove-tail end milling tool for milling in a workpiece a dove-tail slot having angulated undercut shoulder surfaces and a planar bottom surface, comprising:

(a) a tool shank defining an axis of rotation and having a milling head at one end thereof, said milling head defining at least one cutter station having a generally triangular planar cutter support surface and defining a cutter locator shoulder;

(b) a replaceable, generally triangular cutter insert composed of durable metal cutting material and defining three cutting edges being oriented in angular relation of 60° with one another, one of said cutting edges engaging and being oriented by said cutter locator shoulder for positioning two of said cutting edges of said cutter for cutting a dove-tail slot, said cutter insert defining a screw opening centrally thereof;

(c) a retainer screw extending through said screw opening and being threaded into said cutter station at said cutter support surface for retaining said cutter insert in releasable assembly with said milling head at said cutter station;

(d) said generally triangular cutter support surface being in angular relation with said axis of rotation and said cutter locator shoulder being at an angle for orienting a second of said cutting edges of said cutter insert at a designated angle for cutting undercut dove-tail shoulder surfaces of a designated angle and orienting a third cutting edge of said cutter insert at a clearance angle with respect to the planar bottom surface of the dove-tail slot being generated by said cutter insert.

2. The dove-tail end milling tool of claim 1, wherein said milling head defines a plurality of substantially identical cutter stations being equally spaced about said axis of rotation of said tool shank for support of a plurality of said generally triangular cutter inserts in position for milling said dovetail lots.

3. The dove-tail end milling tool of claim 1, wherein:

said cutter locator shoulder accomplishing positioning of said cutter insert at a predetermined cutting rake angle, a predetermined axial rake angle and a predetermined radial rake angle.

4. The dove-tail end milling tool of claim 1, wherein:

(a) said milling head defining an end surface for positioning adjacent a workpiece to be milled; and (b) said cutter locator shoulder positioning an exposed cutting portion of said cutter insert at a location beyond said end surface for cutting engagement with a workpiece and defining a clearance between the milling head and the workpiece.

5. The dove-tail end milling tool of claim 1, wherein said generally triangular cutter insert having:

(a) a cutting rake angle of about plus 15 degrees;

(b) an axial rake angle of about plus 10 degrees; and (c) a radial rake angle of about minus 14 degrees.

6. A dove-tail end milling tool for milling dove-tail slots having angulated undercut shoulder surfaces and a planar bottom surface, comprising:

(a) a tool shank defining a longitudinal axis and having a milling head at one end thereof, said milling head defining a plurality of cutter stations oriented in equally angularly spaced relation about said longitudinal axis;

(b) each of said cutter stations having a generally planar, generally triangular cutter support surface of a dimension for stable support of said cutter insert and being oriented in angular relation with said longitudinal axis;

(c) a replaceable, generally triangular cutter insert composed of durable metal cutting material and defining three cutting edges being oriented in angular relation with one another, said three cutting edges having included angles of 60° with one another and being less than the angle of the angulated undercut shoulder surface with the planar bottom surface of the dove-tail slots, said cutter insert having a cutting rake of about plus 15°, an axial rake angle of about plus 10° and a radial rake angle of about minus 14°;

(d) a locator shoulder being defined by said milling head and being engaged by one of said cutting edges for accurately positioning a second of said three cutting edges of said cutter insert for cutting said undercut shoulder surfaces of said dove-tail slot and for positioning a third of said three cutting edges of said cutter insert for cutting said planar bottom surface of said dove-tail slot and for positioning said third of said three cutting edges for cutting said planar bottom surface and defining a clearance angle of said third of said cutting edges with said planar bottom surface;

(e) a retainer screw extending through said cutter insert and into said cutter station for retaining said cutter insert in releasable assembly with said milling head at said cutter station with two of said three cutting edges exposed for simultaneous milling of said planar bottom surface and at least one of said angulated undercut shoulder surfaces and with one of said cutting edges oriented at a clearance angle with the planar bottom surface of the dove-tail slot.

7. The dove-tail end milling tool of claim 6, wherein:

said locator shoulder positioning said cutter insert at a predetermined cutting rake angle, a predetermined axial rake angle and a predetermined radial rake angle.

8. A dove-tail end milling tool for milling dove-tail slots having angulated undercut shoulder surfaces and a planar bottom surface, comprising:

(a) a plurality of replaceable, triangular cutter inserts composed of durable metal cutting material and defining three cutting edges being oriented in equal angular relation with one another and having included angles of 60° with one another;

(b) a tool shank defining an axis of rotation and having a milling head at one end thereof, said milling head each having a plurality of cutter stations having a generally planar, generally triangular cutter support surface of a dimension for stable support of said one of triangular cutter inserts, each of said cutter stations having a locator shoulder being defined by said milling head and being engaged by one of said cutting edges of said triangular cutter insert for accurately positioning a second of cutting edges of said cutter insert for cutting said undercut shoulder surface of said dove-tail slot and positioning a third of said cutting edges for cutting the planar bottom surface of the dove-tail slot and;

(c) retainer screws extending through each of said cutter inserts and into said cutter stations for retaining said cutter insert in releasable assembly with said milling head at said cutter station; and (d) said locator shoulder orienting one cutting edge of said cutter insert for cutting undercut dove-tail shoulder surfaces at a designated angle and orienting an adjacent cutting edge of said cutter insert at a clearance angle with respect to the planar bottom surface being generated by said cutter insert and accomplishing positioning of said cutter insert at a cutting rake angle of about plus 15°, a axial rake angle of about plus 10° and a radial rake angle of about minus 14°.

9. The dove-tail end milling tool of claim 8, wherein said cutter locator shoulder orienting one cutting edge of said cutter insert comprising:

(a) a generally planar, generally triangular cutter support surface of a dimension for stable support of said cutter insert and being oriented an angular relation with said axis of rotation; and (b) said locator shoulder being defined by said milling head and being engaged by one of said cutting edges of said generally triangular insert for accurately positioning said cutter insert for cutting said undercut shoulder surfaces of said dove-tail slot and for defining said clearance angle.

\* \* \* \* \*